United States Patent
Hall et al.

[19]

[11] Patent Number: 6,137,696
[45] Date of Patent: Oct. 24, 2000

[54] SWITCHING REGULATOR FOR POWER CONVERTER WITH DUAL MODE FEEDBACK INPUT AND METHOD THEREOF

[75] Inventors: Jefferson W. Hall, Phoenix; Jade Alberkrack, Tempe, both of Ariz.

[73] Assignee: Semicondutor Components Industries, LLC, Phoenix, Ariz.

[21] Appl. No.: 09/289,807

[22] Filed: Apr. 12, 1999

[51] Int. Cl.[7] .......................... H02M 3/335; H02M 7/44
[52] U.S. Cl. ................ 363/21; 363/97; 323/902
[58] Field of Search .................. 363/21, 97, 131, 363/95; 323/902

[56] References Cited

U.S. PATENT DOCUMENTS

| | | | |
|---|---|---|---|
| 5,438,499 | 8/1995 | Bonte et al. | 363/21 |
| 5,862,044 | 1/1999 | Shioya et al. | 363/21 |
| 5,889,508 | 3/1999 | Jutras | 323/267 |
| 5,903,452 | 5/1999 | Yang | 363/97 |
| 5,956,242 | 9/1999 | Majid et al. | 363/21 |
| 5,982,639 | 11/1999 | Balakirshnan | 363/21 |
| 5,991,171 | 11/1999 | Cheng | 363/21 |
| 5,991,172 | 11/1999 | Jovanovic et al. | 363/21 |
| 5,995,384 | 11/1999 | Majid et al. | 363/21 |
| 6,009,000 | 12/1999 | Siri | 363/21 |

OTHER PUBLICATIONS

"TNY253/254/255 TinySwitch™ Family, Energy Efficient, Low Power Off–line Switchers", Power Integrations, Inc., Feb. 1999.

*Primary Examiner*—Peter S. Wong
*Assistant Examiner*—Bao Q. Vu
*Attorney, Agent, or Firm*—Robert D. Atkins

[57] ABSTRACT

A switching power supply (10) uses a switching regulator (18) that is capable of operating in a dual mode with either primary side regulation or secondary side regulation. The primary and secondary side regulation schemes generate opposite phase feedback signals. The switching regulator has first (56, 62) and second (70, 74) detectors on the feedback input which detect when the feedback signal is less than a first value and also detect when the feedback signal is greater than a second value. By monitoring either case, the switching regulator can enable and disable a gate drive signal in response to opposite phases of the feedback signal and thereby regulate the switching power supply.

23 Claims, 2 Drawing Sheets

SWITCHING REGULATOR FOR POWER CONVERTER WITH DUAL MODE FEEDBACK INPUT AND METHOD THEREOF

BACKGROUND OF THE INVENTION

The present invention relates in general to power supply regulation and, more particularly, to a switching regulator capable of receiving feedback information of opposite phase.

Most if not all electronic devices require a DC voltage of appropriate level for proper operation. The DC voltage is typically derived from an AC power source, e.g. by plugging a power supply into a wall socket. The AC voltage available at the wall socket is converted to a DC bulk voltage by a full-wave rectifier diode bridge. The DC bulk voltage is further converted to a regulated DC output voltage by a switching power supply.

The switching power supply uses a transformer, or an inductor depending on the configuration, as an energy transfer element. For example, a flyback-type power supply has a power switching transistor coupled to one side of the primary winding of a transformer. The power transistor turns on and off as determined by a regulator circuit to alternately store energy in the magnetic field of the transformer and transfer the stored energy to the secondary winding. The secondary winding of the transformer develops an output voltage across a shunt capacitor coupled across the secondary winding as a function of the energy transfer. The voltage across the capacitor provides the DC output voltage of the switching power supply.

The DC output voltage increases and decreases with the applied load. An increasing load decreases the DC output voltage and a decreasing load increases the DC output voltage. The DC output voltage, or a representation thereof, is fed back to the regulator circuit to allow the switching power supply to compensate for load variation. As the load increases, the DC output voltage decreases which causes the regulator to leave the power transistor on for a longer period of time to store more energy in the magnetic field. The additional energy is transferred to the secondary winding during the off time of the power transistor to supply the increased load and re-establish the DC output voltage. As the load decreases, the DC output voltage increases which causes the regulator to leave the power transistor on for a shorter period of time to store less energy in the magnetic field. The reduced energy transfer to the secondary winding during the off time of the power transistor causes the power supply to adjust to the decreased load and reduces the DC output voltage back to its steady-state value.

The feedback circuit is configured as either primary side regulation or secondary side regulation. In secondary side regulation, the DC output voltage is monitored directly to develop the feedback signal. In primary side regulation, an auxiliary winding of the transformer develops a feedback voltage proportional to the DC output voltage across the secondary winding as determined by the transformer windings turns ratio. A feedback signal generated by primary side regulation can be of opposite phase with respect to a feedback signal generated by secondary side regulation. That is, a primary side feedback signal may be asserted as a high voltage whereas a secondary side feedback signal may be asserted as a low voltage.

Some prior art regulator circuits are configured as a gated oscillator where the power transistor receives a fixed frequency, fixed duty cycle control signal which is enabled or disabled in response to the feedback signal. One type of gated oscillator regulator circuit accepts primary side regulation while another type of gated oscillator regulator circuit accepts secondary side regulation. Integrated switching regulator circuits typically do not accept both phases of feedback information. To accommodate different types of regulation, external circuitry is used to change the phase of the feedback signal to match the regulator requirements. For example, the feedback signal may be routed through a current mirror to invert the phase. The additional external components add time, cost, and complexity for the power supply manufacturers.

Hence, a need exists for an integrated regulator circuit which accepts either primary side regulation or secondary side regulation directly without using external circuitry to change the phase of the feedback signal.

DETAILED DESCRIPTION OF THE PREFERRED EMBODIMENT

Figure 1:
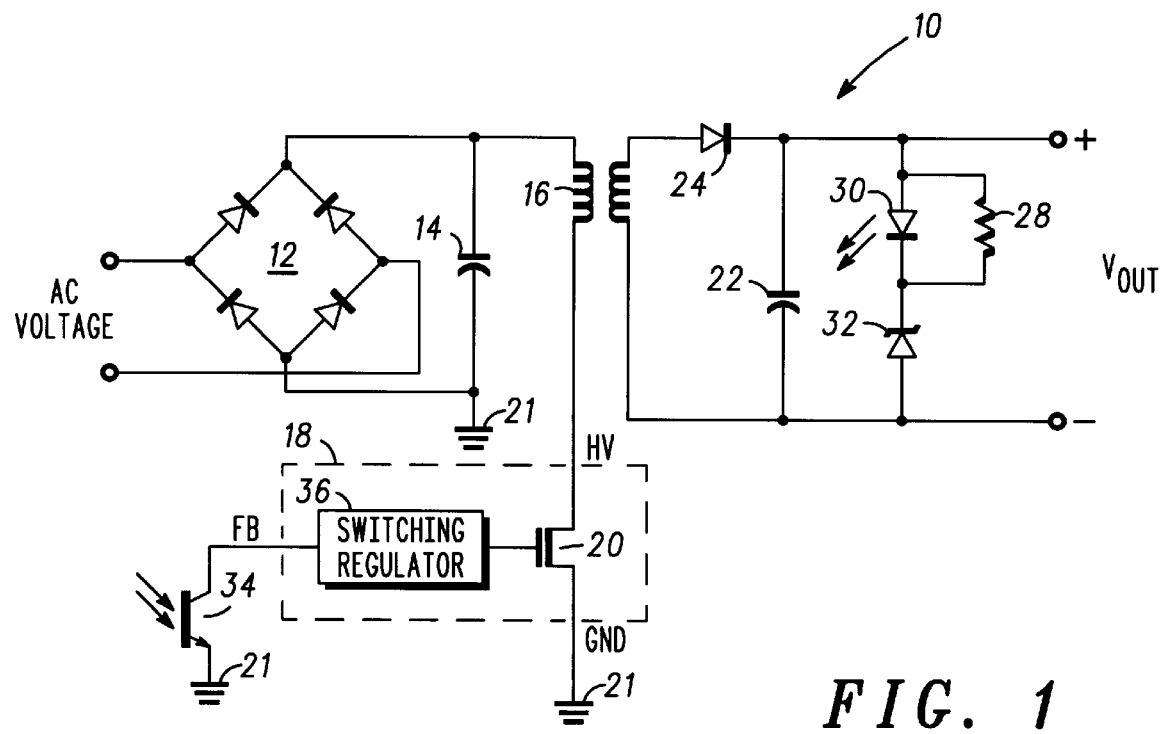
FIG. 1 illustrates a switching power supply using secondary side regulation.

Referring to FIG. 1, a switching power supply 10 is shown receiving an AC line voltage. The AC line voltage is converted to a DC bulk voltage by full-wave rectifier diode bridge 12. Capacitor 14 filters the DC bulk voltage. The primary winding of transformer 16 receives the DC bulk voltage. Regulator circuit 18 is implemented as an integrated circuit (IC) using conventional high voltage IC manufacturing processes. The IC package is a three or four pin device with one pin (FB) as the feedback input to switching regulator 36. A second pin (HV) is connected to the drain of power transistor 20 for coupling to the high voltage on the primary winding of transformer 16. A third pin (GND) is coupled to power supply conductor 21 operating at ground potential. A fourth pin (not shown) of the IC package may be coupled to a compensation or by-pass capacitor, or possibly a separate positive power supply input to the IC.

Power transistor 20 operates on charging cycles controlled by switching regulator 36. When power transistor 20 conducts, an inductor current flows through the primary winding and stores energy in the magnetic field of transformer 16. When power transistor 20 is non-conductive, the energy stored in the magnetic field is transferred to the secondary winding. Capacitor 22 is coupled across the secondary winding of transformer 16 to develop a DC output voltage $V_{OUT}$. Diode 24 prevents current flow back into the secondary winding.

A current flows through resistor 28 and zener diode 32 under nominal operating conditions. Optical light-emitting diode (LED) 30 and photo-detection transistor 34 operate as an optical isolator to electrically isolate and optically couple the feedback information from capacitor 22 to the FB pin of switching regulator IC 18. LED 30 emits photons when forward biased in response to the current flow through the diode. Photo-detection transistor 34 receives the photons and conducts current through its collector-emitter conduction path in response to the received photons. If LED 30 is not forward biased, then no photons are produced and transistor 34 is non-conductive. If LED 30 is forward biased, then a current flowing through LED 30 generates a quantity of photons proportional to the current flow through the diode. The photons are received by the photo-detection base of transistor 34 to render it conductive. Transistor 34 attempts to conduct current from its collector to its emitter. However, switching regulator 36 is unable to source current from its FB pin into the collector of transistor 34. Therefore, transistor 34 saturates and the collector of transistor 34 is pulled to a low voltage.

When an increasing output load causes the DC output voltage $V_{OUT}$ to be below a predetermined regulation threshold, then the voltage across resistor 28 is such that LED 30 is not forward biased. The regulation threshold is set by the voltage across zener diode 32 plus the voltage across LED 30 when forward biased. Transistor 34 is non-conductive and the collector of transistor 34 is high impedance (feedback not asserted). An decreasing output load causes the DC output voltage $V_{OUT}$ to be above the regulation threshold whereby LED 30 becomes forward biased. A current flows through LED 30 and generates a quantity of photons proportional to the current flow which are transferred to the base of transistor 34. Transistor 34 conducts and its collector is pulled to a low voltage (feedback asserted). The low voltage on the collector of transistor 34 is in response to the DC output voltage $V_{OUT}$ operating below the regulation threshold represents feedback information that is provided to the FB pin of switching regulator IC 18. Switching regulator 36 provides a gate drive signal to the gate of power transistor 20 to turn it on and off as necessary to regulate the DC output voltage $V_{OUT}$.

The regulation scheme shown in FIG. 1 is commonly called secondary side regulation because the feedback information is generated on the secondary side of the transformer. In the present embodiment, the feedback information is either asserted (low voltage) or not asserted (high impedance) in response to the output load and consequently whether the DC output voltage $V_{OUT}$ is above or below the regulation threshold. Switching regulator 36 is configured to continue pushing the DC output voltage $V_{OUT}$ to a higher value when the feedback signal is not asserted. When the DC output voltage $V_{OUT}$ is greater than the regulation threshold and the feedback signal is asserted, then the feedback loop provides a low voltage to the FB pin which causes switching regulator 36 to disable the gate drive signal to power transistor 20 for one or more charging cycles and hold the DC output voltage $V_{OUT}$ at the regulation threshold. Disabling the gate drive signal prevents power transistor 20 from conducting during a particular charging cycle. Holding power transistor 20 off during one or more charging cycles stores less energy in the magnetic field of the transformer. Consequently, less energy is transferred to the secondary winding and the DC output voltage $V_{OUT}$ decreases accordingly.

Figure 2:
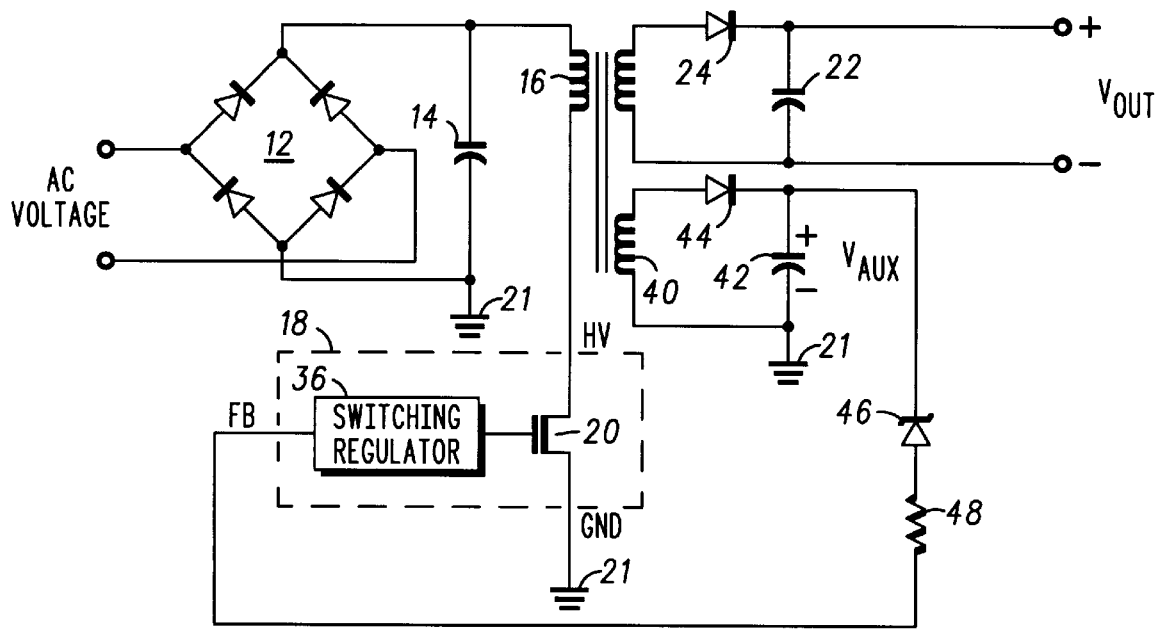
FIG. 2 illustrates a switching power supply using primary side regulation.

A primary side regulation scheme is shown in FIG. 2. Circuit components having a similar function are assigned the same reference numbers used in FIG. 1. In the embodiment shown in FIG. 2, the DC output voltage $V_{OUT}$ across the secondary winding is reflected across auxiliary winding 40 of transformer 16 in proportion to the turns ratio of the transformer. Capacitor 42 is coupled across auxiliary winding 40 to develop a DC output voltage $V_{AUX}$. Diode 44 prevents current flow back into the auxiliary winding. Zener diode 46 and resistor 48 are serially coupled from capacitor 42 to the FB pin of switching regulator IC 18.

When the DC output voltage $V_{OUT}$ increases, the DC output voltage $V_{AUX}$ increases. When the DC output voltage $V_{OUT}$ decreases, the DC output voltage $V_{AUX}$ decreases according to the turns ratio of the transformer. Zener diode 46 conducts when the DC output voltage $V_{AUX}$ is greater than a predetermined regulation threshold. The regulation threshold is set by the forward voltage across zener diode 46, the voltage drop across resistor 48, and the voltage at the FB pin necessary to trip the feedback detector. When the DC output voltage $V_{AUX}$ is less than the regulation threshold, then zener diode 46 is non-conductive and the FB pin of switching regulator IC 18 is high impedance (not asserted). The feedback input is internally set to a nominal voltage as discussed below. When the DC output voltage $V_{AUX}$ exceeds the regulation threshold in response to a decreasing output load, then zener diode 46 conducts current through resistor 48 to pull the FB pin of switching regulator IC 18 to a high voltage (asserted). The asserted feedback signal at the FB pin which causes switching regulator 36 to disable the gate drive signal to power transistor 20 for one or more charging cycles and hold the DC output voltage $V_{OUT}$, and likewise DC output voltage $V_{AUX}$, at the regulation threshold. Disabling the gate drive signal prevents power transistor 20 from conducting during a particular charging cycle. Holding power transistor 20 off during one or more charging cycles stores less energy in the magnetic field of the transformer. Consequently, less energy is transferred to the secondary winding and the DC output voltage $V_{OUT}$ decreases accordingly.

Notice the feedback control in the primary regulation scheme is of opposite phase with respect to the feedback control in the secondary regulation scheme. In primary regulation, when the DC output voltage $V_{AUX}$ is greater than the regulation threshold, the FB pin is set to a high voltage, i.e. the first phase. In secondary regulation, when the DC output voltage $V_{OUT}$ is greater than the regulation threshold, the FB pin is pulled to a low voltage, i.e. the second phase opposite with respect to the first phase. With no knowledge of the selected regulation scheme, the regulator IC 18 must be capable of receiving feedback information that is asserted in either of the first and second phases. The feedback input is asserted when the FB pin is pulled to a high voltage or when the FB pin is pulled to a low voltage.

Primary side regulation does not use and therefore saves the expense of the optical isolator described above for secondary side regulation. However, primary side regulation requires an auxiliary winding on the transformer. Furthermore, primary side regulation is less accurate than secondary side regulation because primary side regulation is based on an output voltage across the auxiliary winding. Since there is inherent variability in the transformer turns ratio from one power supply to the next, such variability leads to inaccuracy in the ratio of voltage across the secondary winding and the voltage across the auxiliary winding.

A feature of the present invention is that regulator IC 18 is dual mode in that it accepts either type of regulation scheme discussed above without any additional circuitry, special accommodations, or prior configuration for the selected type of regulation. The end user or customer designs the power supply board using regulator IC 18 by selecting either primary regulation or secondary regulation and simply connects the feedback loop to the FB pin without concern for the phase of the feedback information.

Figure 3:
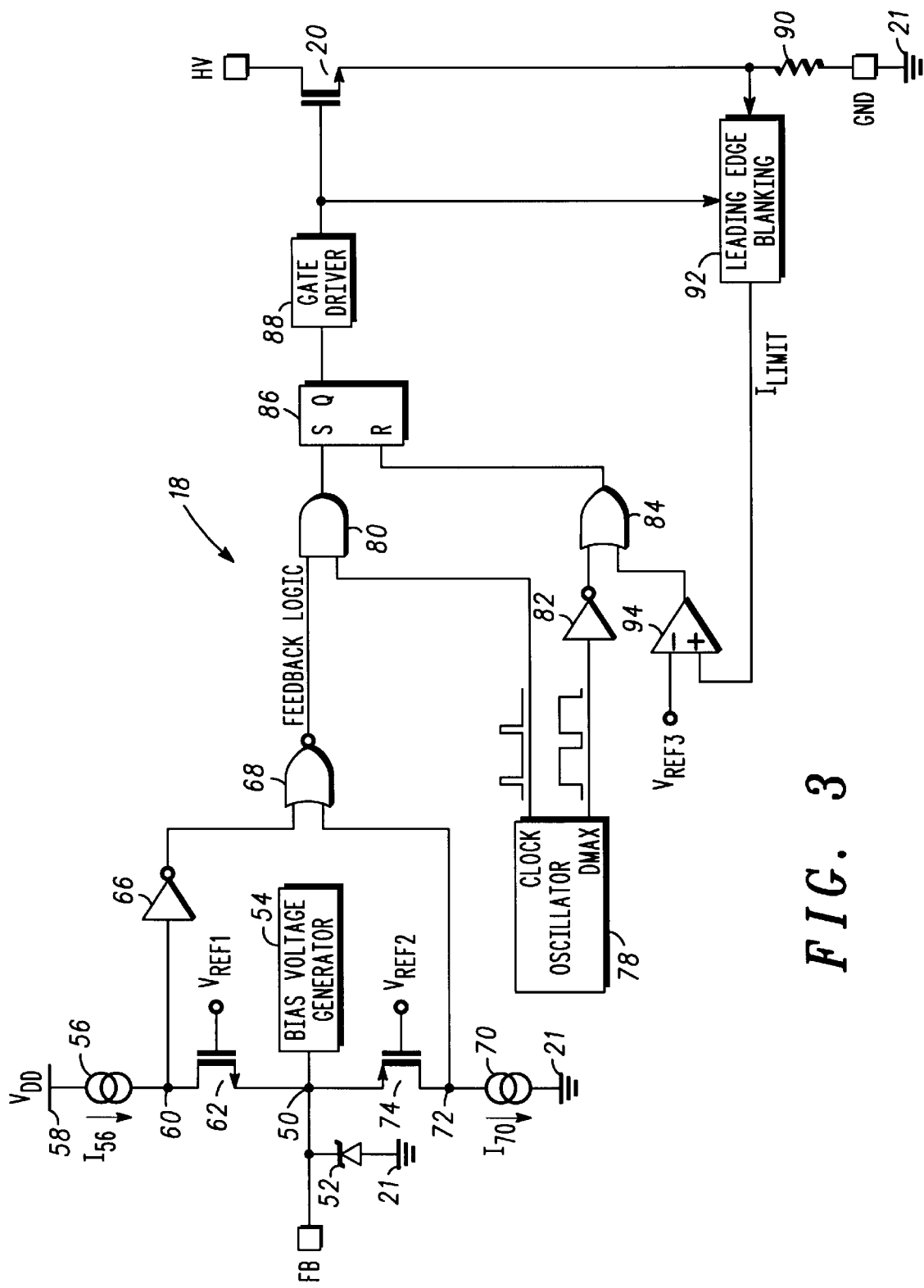
FIG. 3 illustrates the regulator circuit of FIGS. 1 and 2.

Further detail of regulator IC 18 is shown in FIG. 3. The FB pin is coupled to node 50. Zener diode 52 is coupled to the FB pin for electrostatic discharge (ESD) protection. Node 50 is set to a nominal voltage, say 3.5 volts, by bias voltage generator 54. Bias voltage generator 54 has a high impedance output and is easily overdriven by the signal on the FB pin.

Current source 56 is referenced to power supply conductor 58 operating at a positive potential such as $V_{DD}$=8 volts. Current source 56 sources a current $I_{56}$ into node 60. A reference voltage $V_{REF1}$, set to 3.5 volts, is applied to the gate of transistor 62. With bias voltage generator 54 operating at 3.5 volts, then transistor 62 is non-conductive because the applied gatesource voltage ($V_{GS}$) is zero volts which is less than the turn-on threshold of the device. Current source 56 goes into saturation and pulls node 60 to a logic one. Inverter 66 complements the logic one and presents a logic zero to one input of NOR gate 68.

Current sink 70 is referenced to power supply conductor 21 operating at ground potential. Current sink 70 sinks a current $I_{70}$ from node 72. A reference voltage $V_{REF2}$, set to 3.5 volts, is applied to the gate of transistor 74. With bias voltage generator 54 operating at 3.5 volts, then transistor 74 is also non-conductive because the applied $V_{GS}$ is zero volts which is less than the turn-on threshold. Current source 70 goes into saturation and pulls node 72 to a logic zero. The logic zero is applied to a second input of NOR gate 68. With logic zeroes at both its inputs, the FEEDBACK LOGIC signal at the output of NOR gate 68 is logic one. Thus, with no feedback signal on the FB pin, the FEEDBACK LOGIC signal is logic one.

If switching power supply 10 is configured for secondary side regulation as shown in FIG. 1, then when the DC output voltage $V_{OUT}$ is greater than the regulation threshold, LED 30 is forward biased and conducts a current to turn on transistor 34. The FB pin and node 50 is pulled to a low potential by the collector of transistor 34. The $V_{GS}$ applied to transistor 62 is now greater than its turn-on threshold. Transistor 62 conducts a current greater than the current $I_{56}$ which causes node 60 to switch to logic zero. The output of inverter 66 goes to logic one and the FEEDBACK LOGIC signal at the output of NOR gate 68 goes to logic zero.

Current source 56 and transistor 62 operate as a feedback detector circuit. When the signal on node 50 is greater than a value with respect to the reference voltage $V_{REF1}$, such that the $V_{GS}$ of transistor 62 is less than the turn-on threshold of the device, then transistor 62 is non-conductive and current source 56 sets the output detect signal of the detector, i.e. node 60, to a first logic state. In this case, the first logic state of the output detector signal indicates that the feedback signal on the FB pin is not asserted and node 50 is not being driven by transistor 34 in secondary side regulation. Switching regulator 36 is allowed to generate a gate drive signal to turn on power transistor 20. The bias voltage generator 54 establishes the voltage on node 50 at a nominal value (3.5 volts) to keep transistor 62 non-conductive.

When the signal on the FB pin is less than a value with respect to the reference voltage $V_{REF1}$, such that the $V_{GS}$ of transistor 62 exceeds the turn-on threshold of the device, then transistor 62 conducts and sets the output detect signal of the detector to a second logic state. If the turn-on threshold of transistor 62 is 1.2 volts, then that value of the feedback signal at node 50 necessary to turn on transistor 62 and set the output detect signal of the detector to the second logic state is 3.5−1.2=2.3 volts (or less). In this case, the feedback signal on the FB pin is asserted by transistor 34. The bias voltage generator 54 is overridden by the feedback signal. The second logic state of the output detector signal indicates that the feedback signal on the FB pin is asserted. Switching regulator 36 is controlled to disable the gate drive signal to power transistor 20 because the DC output voltage $V_{OUT}$ is above its regulation threshold. The output detector signal causes charging cycles of power transistor 20 to be skipped so that the energy transfer to the secondary winding is reduced to bring the DC output voltage $V_{OUT}$ back to its desired value.

Alternately, if switching power supply 10 is configured for primary side regulation as shown in FIG. 2, then when the DC output voltage $V_{AUX}$ is greater than the regulation threshold, zener diode 46 becomes forward biased and sources current into the FB pin and node 50. The voltage at node 50 increases causing transistor 74 to turn on with its $V_{GS}$ greater than the turn-on threshold. Transistor 74 conducts a current greater than current $I_{70}$ which sets node 72 to logic one. The FEEDBACK LOGIC signal at the output of NOR gate 68 goes to logic zero.

Current source 70 and transistor 74 operate as a feedback detector circuit. When the signal on node 50 is less than a value with respect to the reference voltage $V_{REF2}$, such that the $V_{GS}$ of transistor 74 is less than the turn-on threshold of the device, then transistor 74 is non-conductive and current source 70 sets the output detect signal of the detector, i.e. node 72, to a first logic state. In this case, the first logic state of the output detector signal indicates that the feedback signal on the FB pin is not asserted and node 50 is not being driven by zener diode 46 in primary side regulation. The bias voltage generator 54 establishes the voltage on node 50 at a nominal value to keep transistor 74 non-conductive.

When the signal on the FB pin is greater than a value with respect to the reference voltage $V_{REF2}$, such that the $V_{GS}$ of transistor 74 exceeds the turn-on threshold of the device, then transistor 74 conducts and sets the output detect signal of the detector to a second logic state. If the turn-on threshold of transistor 74 is 1.2 volts, then that value of the feedback signal at node 50 necessary to turn on transistor 74 and set the output detect signal of the detector to the second logic state is 3.5+1.2=4.7 volts (or more). In this case, the feedback signal on the FB pin is asserted by zener diode 46. The bias voltage generator 54 is overridden by the feedback signal. The second logic state of the output detector signal indicates that the feedback signal on the FB pin is asserted. Switching regulator 36 is controlled to disable the gate drive signal to power transistor 20 because the DC output voltage $V_{AUX}$ is above its regulation threshold. The output detector signal causes charging cycles of power transistor 20 to be skipped so that the energy transfer to the secondary winding is reduced to bring the DC output voltage $V_{AUX}$ back to its desired value. The outputs of the detector circuits are logically combined by NOR gate 68 such that either detector controls the switching regulator as discussed below.

Thus, the event of either the DC output voltage $V_{OUT}$ exceeding its regulation threshold or the DC output voltage $V_{AUX}$ exceeding its regulation threshold is detected and presented as a logic zero FEEDBACK LOGIC signal.

Oscillator 78 produces two oscillator signals, CLOCK and DMAX, synchronized at the leading edge and each having a fixed frequency and duty cycle. The CLOCK signal is a pulse train which is applied to one input of AND gate 80. The second input of AND gate 80 receives the FEEDBACK LOGIC signal. The DMAX oscillator signal having about a 70% duty cycle is applied to one input of inverter 82. The output of inverter 82 is coupled to one input of OR gate 84. RS flipflop 86 has a set input coupled to the output of AND gate 80 and a reset input coupled to the output of OR gate 84. The Q-output of RS flipflop 86 is buffered by gate driver 88. Gate driver 88 provides a gate drive signal to the gate of power transistor 20. The inductor current flow through power transistor 20 is sensed across resistor 90 and fed back through leading edge blanking circuit 92. Further detail of leading edge blanking circuit 92 is disclosed in U.S. Pat. No. 5,418,410 and hereby incorporated by reference. Briefly, leading edge blanking circuit 92 inhibits current sensing during a portion of the rising edge of the gate drive signal to power transistor 20. When the current sense signal $I_{LIMIT}$ exceeds the reference voltage $V_{REF3}$, then the output of comparator 94 switches to logic one. The reference voltage $V_{REF3}$ is set to 0.5 volts. The output of comparator 94 is coupled to a second input of OR gate 84.

In an alternative embodiment, power transistor 20 may be implemented with a first source conduction terminal coupled to the GND pin which conducts the majority of the inductor current. A second source terminal of power transistor 20 conducts a minority of the inductor current. The second source terminal includes resistor 90 for sensing current through power transistor 20. Separating the main current conduction path from the sense current conduction path reduces the effective drain-source resistance of power transistor 20 and allows more efficient operation.

The rising edge of the CLOCK pulse train sets the Q-output of flipflop 86 to logic one when the FEEDBACK LOGIC signal is logic one. The logic one from flipflop 86 enables the gate drive signal from gate driver 88 and turns on power transistor 20 to conduct current through the primary winding of transformer 16. RS flipflop 86 is reset by the current through power transistor 20 reaching a current limit threshold whereby $I_{LIMIT}$ exceeds $V_{REF3}$ and the output of comparator 94 goes to logic one and the output of OR gate 84 goes to logic one. If $I_{LIMIT}$ does not exceed $V_{REF3}$ during any particular cycle, then RS flipflop is reset by the falling edge of DMAX.

The regulation is performed by a logic zero FEEDBACK LOGIC signal blocking the CLOCK signal from setting RS flipflop 86. If the RS flipflop 86 is not set at the rising edge of the CLOCK signal on any particular cycle, then power transistor 20 does not turn on for the duration of that particular cycle. The logic zero FEEDBACK LOGIC signal causes the switching regulator 36 to skip charging cycles of power transistor 20 when the DC output voltage $V_{OUT}$ or the DC output voltage $V_{AUX}$, depending on the regulation scheme, is greater than the regulation threshold.

In an alternate embodiment, the FB pin could be implemented as two separate pins on the switching regulator IC with a first pin coupled to the source of transistor 62 and a second pin coupled to the source of transistor 74. If the power supply system designer elects to use secondary side regulation, then the feedback connects to the first pin. If the power supply system designer elects to use primary side regulation, then the feedback connects to the second pin.

There is no need for any additional external components to handle both primary side regulation and secondary side regulation. The same switching regulator IC responds to either phase of the feedback signal to control its internal regulation circuitry. The present invention saves the power supply system designer time, component costs, and reduces system complexity.

In summary, the present invention provides a switching regulator for use in a switching power supply that is capable of operating with either primary side regulation or secondary side regulation. The primary and secondary side regulation schemes generate opposite phase feedback signals. The switching regulator has a detector on the feedback input which detects when the feedback signal is less than a first threshold and also detects when the feedback signal is greater than a second threshold. By monitoring either case, the switching regulator can disable a gate drive signal in response to either phase of the feedback signal and thereby regulate the switching power supply.

What is claimed is:

1. A regulator circuit, comprising:
    a first detector coupled for receiving a first feedback signal and generating a first detect signal when the first feedback signal is less than a first threshold value;
    a second detector coupled for receiving a second feedback signal and generating a second detect signal when the second feedback signal is greater than a second threshold value which is greater than the first threshold value; and
    a logic circuit having first and second inputs responsive to the first and second detect signals respectively and having an output providing a control signal to control operation of the regulator circuit.

2. The regulator circuit of claim 1, wherein the first and second feedback signals are received on a first input of the regulator circuit.

3. The regulator circuit of claim 2 further including a bias voltage generator coupled to the first input of the regulator circuit.

4. The regulator circuit of claim 1, wherein the first detector includes:
    a first current source having an output for providing a first current and coupled to the first input of the logic circuit; and
    a first transistor having a first conduction terminal coupled to the output of the first current source at a first node, a second conduction terminal coupled to a first input of the regulator circuit, and a control terminal coupled for receiving a first reference voltage.

5. The regulator circuit of claim 4, wherein the second detector includes:
    a second current source having an output for providing a second current and coupled to the second input of the logic circuit; and
    a second transistor having a first conduction terminal coupled to the output of the second current source at a second node, a second conduction terminal coupled to the first input of the regulator circuit, and a control terminal coupled for receiving a second reference voltage.

6. An integrated circuit having a feedback pin coupled for receiving a feedback signal, comprising:
    a first detector coupled to the feedback pin for detecting when the feedback signal is less than a first threshold value;
    a second detector coupled to the feedback pin for detecting when the feedback signal is greater than a second threshold value which is greater than the first threshold value; and
    a switching regulator circuit responsive to output signals of the first and second detectors for enabling and disabling a gate drive signal.

7. The integrated circuit of claim 6, wherein the first detector includes:
    a first current source having an output for providing a first current; and
    a first transistor having a first conduction terminal coupled to the output of the first current source at a first node, a second conduction terminal coupled to the feedback pin of the integrated circuit, and a control terminal coupled for receiving a first reference voltage.

8. The integrated circuit of claim 7, wherein the second detector includes:
    a second current source having an output for providing a second current; and a second transistor having a first conduction terminal coupled to the output of the second current source at a second node, a second conduction terminal coupled to the feedback pin of the integrated circuit, and a control terminal coupled for receiving a second reference voltage.

9. The integrated circuit of claim 8 further including a first logic gate having a first input coupled to the first node, a second input coupled to the second node, and an output providing a feedback logic signal.

10. The integrated circuit of claim 9, wherein the switching regulator circuit includes:
a second logic gate having a first input coupled to the output of the first logic gate;
an oscillator having a first output coupled to a second input of the second logic gate;
a third logic gate having a first input coupled to a second output of the oscillator;
a flipflop having a first input coupled to an output of the second logic gate, and a second input coupled to an output of the third logic gate; and
a power transistor having first and second conduction terminals coupled to pins of the integrated circuit, and a control terminal coupled to an output of the flipflop.

11. The integrated circuit of claim 10, wherein the switching regulator circuit further includes:
a sense element coupled to a conduction terminal of the power transistor for sensing current flow in the power transistor; and
a comparator having a first input coupled to the sense element, a second input coupled for receiving a third reference voltage, and an output coupled to a second input of the third logic gate.

12. A method of operating a switching regulator, comprising the steps of:
receiving a feedback signal;
detecting if the feedback signal is less than a first threshold value;
detecting if the feedback signal is greater than a second threshold value which is greater than the first threshold value; and
operating a gate drive signal in response to the feedback signal.

13. The method of claim 12 further including the steps of:
sourcing a first current into a first node to establish a first logic state at the first node;
enabling a first transistor coupled to the first node if the feedback signal is less than the first threshold value to change the first node to a second logic state;
sinking a second current from a second node to establish a first logic state at the second node;
enabling a second transistor coupled to the second node if the feedback signal is greater than the second threshold value to change the second node to a second logic state;
operating the gate drive signal if the first node is at the second logic state; and
operating the gate drive signal if the second node is at the second logic state.

14. A method of operating an integrated circuit, comprising the steps of:
receiving a feedback signal on a pin of the integrated circuit, wherein the feedback signal is asserted with either of first and second phases;
generating a control signal upon detecting either of the first and second phases of the feedback signal exceeding first or second threshold values respectively; and controlling circuitry on the integrated circuit with the control signal.

15. The method of claim 14 further including the step of:
operating a gate drive signal in response to the feedback signal.

16. The method of claim 15 further including the steps of:
sourcing a first current into a first node to establish a first logic state at the first node;
enabling a first transistor coupled to the first node if the feedback signal is less than the first threshold value to change the first node to a second logic state;
sinking a second current from a second node to establish a first logic state at the second node;
enabling a second transistor coupled to the second node if the feedback signal is greater than the second threshold value to change the second node to a second logic state;
operating the gate drive signal if the first node is at the second logic state; and
operating the gate drive signal if the second node is at the second logic state.

17. An integrated circuit for generating a gate drive signal in response to a feedback signal, comprising:
a detector coupled for receiving the feedback signal which is asserted with either of first and second phases, wherein the detector generates a control signal upon detecting either of the first and second phases of the feedback signal exceeding first or second threshold values respectively; and
a regulator circuit responsive to the control signal for operating the gate drive signal.

18. The integrated circuit of claim 17, wherein the detector includes:
a first current source having an output for providing a first current; and
a first transistor having a first conduction terminal coupled to the output of the first current source at a first node, a second conduction terminal coupled for receiving the feedback signal, and a control terminal coupled for receiving a first reference voltage.

19. The integrated circuit of claim 18, wherein the detector further includes:
a second current source having an output for providing a second current; and
a second transistor having a first conduction terminal coupled to the output of the second current source at a second node, a second conduction terminal coupled for receiving the feedback signal, and a control terminal coupled for receiving a second reference voltage.

20. The integrated circuit of claim 19 further including a first logic gate having a first input coupled to the first node, a second input coupled to the second node, and an output providing the control signal to the regulator circuit.

21. An integrated switching control circuit having a control pin and a switching pin, comprising:
a first detector coupled for receiving a first control signal received at the control pin.
a second detector coupled for receiving a second control signal received at the control pin;
a logic gate having first and second inputs responsive to output signals of the first and second detectors respectively;
a latch having an input coupled to an output of the logic gate; and
a switching transistor having a control terminal coupled to an output of the latch, a first conduction terminal coupled to a power supply conductor, and a second conduction terminal coupled the switching pin.

22. The integrated switching control circuit of claim 21, wherein the first detector includes:

a first current source having an output for providing a first current and coupled to the first input of the logic gate; and a first transistor having a first conduction terminal coupled to the output of the first current source at a first node, a second conduction terminal coupled to the control pin, and a control terminal coupled for receiving a first reference voltage.

23. The integrated switching control circuit of claim 21, wherein the second detector includes:

a second current source having an output for providing a second current and coupled to the second input of the logic gate; and a second transistor having a first conduction terminal coupled to the output of the second current source at a second node, a second conduction terminal coupled to the control pin, and a control terminal coupled for receiving a second reference voltage.

* * * * *